(12) United States Patent
Dunn

(10) Patent No.: US 6,999,982 B2
(45) Date of Patent: Feb. 14, 2006

(54) METHOD AND APPARATUS FOR GENERATING RANDOM NUMBERS USING TURBULENT FLUID

(75) Inventor: Tim Dunn, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 597 days.

(21) Appl. No.: 10/167,322

(22) Filed: Jun. 11, 2002

(65) Prior Publication Data

US 2003/0229657 A1    Dec. 11, 2003

(51) Int. Cl.
*G06F 1/02*    (2006.01)

(52) U.S. Cl. ..................... 708/250; 708/255

(58) Field of Classification Search ......... 708/250–256
See application file for complete search history.

(56) References Cited

U.S. PATENT DOCUMENTS

RE31,217 E  *  4/1983  Rodely .................... 73/861.22
5,732,138 A  *  3/1998  Noll et al. .................... 380/28
6,463,449 B1 * 10/2002  Tichenor .................... 708/255
2002/0018563 A1 * 2/2002  Tichenor .................... 380/44

OTHER PUBLICATIONS

M. Haahr, Jun. 1999; "Induction to Randomness and Random Numbers," http://www.random.org/essay.html; printed May 7, 2002; 5 pages.
S. Garner, Thermacore Inc.; "Heat pipes for electronics cooling applications," http:/www.electronics-cooling.com/Resources/EC_Articles/SEP96/sep96_02.htm; printed May 8, 2002; 11 pages.
R. Simons, Electronics Cooling Applications, "Direct liquid Immersion cooling for high power density microelectronics, "http:/www.electronics-cooling.com/Resources/EC_Articles/MAY96/may96_04.htm; printed May 8, 2002; 8 pages.

* cited by examiner

*Primary Examiner*—D. H. Malzahn
(74) *Attorney, Agent, or Firm*—Osha Liang LLP (57) ABSTRACT

A random number generation system, including a turbulent fluid source, a pressure sensor adapted to monitor a pressure of the turbulent fluid source, and a computation module operatively connected to the pressure sensor the module adapted to generate a numeric representation of the pressure.

14 Claims, 3 Drawing Sheets

METHOD AND APPARATUS FOR GENERATING RANDOM NUMBERS USING TURBULENT FLUID

BACKGROUND OF INVENTION

Random numbers are those which when put in series have no pattern in their progression. Typical examples of use of random numbers are: Monte Carlo simulations of naturally random phenomena such as particle interactions and transport, lattice theory calculations, statistical mathematics for evaluation of results of calculations for which the theoretical evaluation seems to be beyond reach, simulations in engineering of nuclear power plants, cryptography for generation of passwords, public keys and secure data transfer protocols.

There are two distinct categories of random numbers, pseudo-random numbers, and true random numbers. Pseudo-random numbers are generally calculated by using an algorithm. In contrast, true random numbers typically obtained from a source of entropy.

Pseudo-random numbers are not truly random. Rather, they are computed from a mathematical formula or simply taken from a pre-calculated list. When using the mathematical formula to generate a sequence of pseudo-random numbers each pseudo-random number is dependent on the previous random number generated. Thus, pseudo-random numbers have the characteristic that they are predictable, i.e., pseudo-random numbers can be predicted if one can determine where in the sequence the first number is taken from.

Pseudo-random numbers are typically generated using a pseudo-random number generator. A number known as the seed is provided to the pseudo-random number generator as an initial number to pass through the formula. Seeds for pseudo-random number generators are usually produced by using some aspect of system time e.g., the time on a system clock when the request for a seed was made by the pseudo-random number generator. The output of the pseudo-random number generator is predictable because each value returned by the pseudo-random number generator is completely determined by the previous value returned and ultimately, the seed from which the pseudo-random number was initially derived. If the number used to compute any one value is known, then every subsequent value returned from the generator may be derived.

While pseudo-random numbers are predicable, pseudo-random numbers do have many useful applications. Pseudo-random numbers work well for Monte Carlo simulations and other statistical sampling or simulation models. Monte Carlo simulations are a group of methods that use pseudo-random numbers to simulate physical events or to solve mathematical problems. These applications typically require only moderate sophistication in their randomness, requiring only that patterns in a sequence don't correspond with naturally occurring sequences.

True random numbers are typically produced by hardware random number generators. True random numbers are non-deterministic, i.e., an external observer should never be able to predict the output of such a device with any consistency, even if the algorithm used by the device is known. For example, if the device generates a series of 0's and 1's, a 0 and a 1 should be equally as likely to occur in the output. Even with complete knowledge of the inner workings of the device, any guess will be right exactly 50% of the time (over some range of behavior).

True random numbers display the properties of uniformity, summation, duplication, and independence. Uniformity is defined as producing an unbiased set of random numbers. For example, if random numbers between 0 and 999 are to be generated then to preserve uniformity no more than half the random numbers should be between 0 and 499. Independence occurs when the random numbers within a set cannot be correlated. Thus, if it is possible to predict something about the next value in the set of random numbers, given that the previous values are known, then the set of numbers is not random. Thus, the probability of observing each value is independent of the previous values. Summation occurs when the sum of two consecutive random numbers is equally likely to be even or odd. Duplication occurs when the repeated numbers are repeated. A set of numbers is not truly random unless the set of numbers displays all of the aforementioned properties.

The quality of randomness of a set of numbers can be measured in a variety of ways. One common method is to compute the information density, or entropy, in a series of numbers. The higher the entropy in a series of numbers, the more difficult it is to predict any selected number on the basis of the preceding numbers in the series. A sequence with a high quality of random numbers will have a high level of entropy.

As previously stated, true random numbers are typically generated by sampling. Entropy is a measure of the disorder, or randomness, of a system. A system having of entropy may be very simple, e.g., the amount of time between keystrokes on a computer keyboard. In practice, however, user input as a source of entropy may be difficult to use. Keystrokes, for example, are often buffered by the computer's operating system, meaning that several keystrokes are collected before they are sent to the program waiting for them. There are many additional sources of entropy, e.g., Random.org, www.random.org, designed and maintained by The Department of Computer Science, Trinity College, Dublin Ireland, uses atmospheric noise from a radio as a source of entropy, and Fourmilab, www.fourilab.ch/hotbits/based in Switzerland uses timing successive pairs of radioactive decays as a source of entropy.

SUMMARY OF INVENTION

In general, in one aspect, the invention relates to a random number generation system, comprising a turbulent fluid source, a pressure sensor adapted to monitor a pressure of the turbulent fluid source, and a computation module operatively connected to the pressure sensor the module adapted to generate a numeric representation of the pressure.

In general, in one aspect, the invention relates to a method for generating a random number, comprising measuring a pressure in a turbulent fluid, converting the measured pressure into numbers, skew correcting the numbers to obtain corrected numbers, and generating the random number using the corrected numbers.

In general, in one aspect, the invention relates to an apparatus for generating a random number, comprising means for measuring a pressure in a turbulent fluid, means for converting the measured pressure into numbers, means for skew correcting the numbers to obtain corrected numbers, and means for generating the random number using the corrected numbers.

Other aspects and advantages of the invention will be apparent from the following description and the appended claims.

DETAILED DESCRIPTION

Exemplary embodiments of the invention will be described with reference to the accompanying drawings. Like items in the drawings are denoted by the same reference numbers throughout for consistency.

The invention relates to a method of generating random numbers using turbulent fluid. Further, the invention relates to using pressure of the turbulent fluid to generate random numbers In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

As the electronics industry is striving towards increased product performance, there has been an increased use of components (e.g., microprocessors) that dissipate more heat per unit volume. As the number of such components increases within a computer, so does the heat dissipated. This development has not been tracked by an equal reduction in power dissipation for the individual components. Thus, on a densely populated circuit board, the power dissipation per area is increasing.

Typically, components are designed to work at relatively low temperatures, thus the heat that they generate must be efficiently removed. Traditionally, removal of heat was achieved through the use of a fan or equivalent device for passing cool air over the components. As the number of components per computer has increased, and the amount heat dissipated per component has increased, traditional fan cooling has proven insufficient to effectively remove heat. Computer manufacturers as a result have been using fluid cooling systems to dissipate the heat generated by the components.

Figure 1:
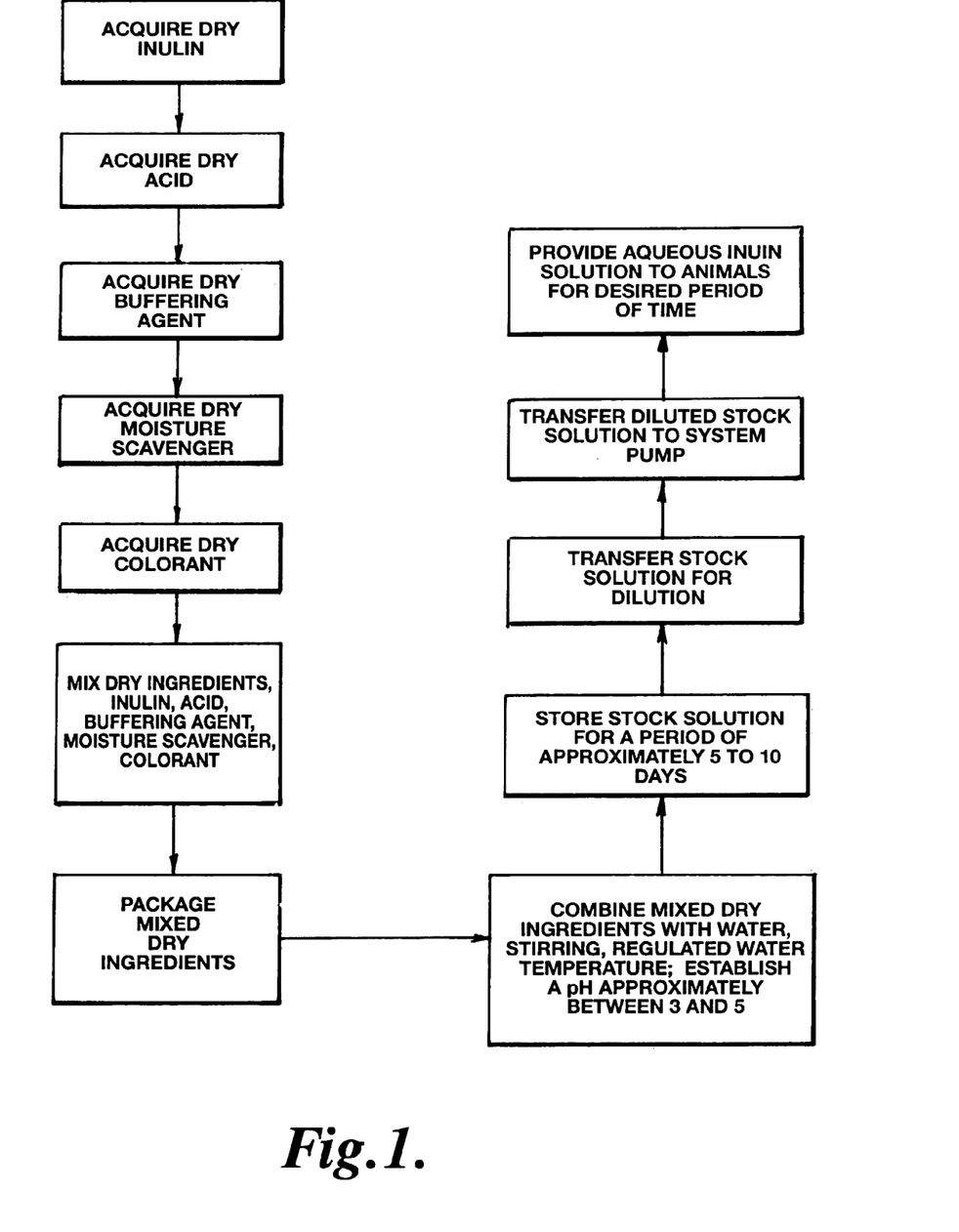
FIG. 1 illustrates a typical computer cooling system for a computer.

FIG. 1 illustrates a typical fluid cooling system for a computer. Generally, heat dissipating components (10) are grouped together (e.g., the heat dissipating components are mounted to a circuit board (not shown). The heat dissipating components (10) are cooled by a cooling fluid that is enclosed in piping (12a). The cooling fluid generally flows through the piping (12a) by direct or indirect action of a pump (14). A heat exchanger (16) is usually used to remove heat absorbed by the cooling fluid. In this particular example, the heat exchanger (16) is a counter-current heat exchanger. A coolant source (18) is used by the heat exchanger (16) to remove the heat absorbed by the cooling fluid.

During typical operation of the fluid cooling system illustrated in FIG. 1, the cooling fluid exits the heat exchanger (16), flows through the piping (12a) to the heat dissipating components (10). Depending on the setup of the cooling system, the cooling fluid may come in direct contact with the heat dissipating components (e.g., CRAY-2 liquid immersion cooling system) or indirect contact with the heat dissipating components (10). In either case, the cooling fluid exiting the heat dissipating components (10) has a higher temperature than the cooling fluid entering the heat dissipating components (10). The cooling fluid then flows through the piping (12a) back to the heat exchanger (16). At this stage the heated cooling fluid in piping (12a) comes in contact with colder surfaces of the heat exchanger (16) cooled by the coolant source (18). As the cooling fluid flows through the heat exchanger the cooling fluid cools. The heat exchanger (16) is typically designed to remove a given amount of heat from the cooling fluid such that the cooling fluid may be continuously used to adequately cool the heat dissipating components (10).

All the aforementioned components of the fluid cooling system may be located inside one computer or distributed across numerous machines or be external to the computer or set of computers that is cools.

The fluid cooling system, as a result of heating the cooling fluid and/or forcing the fluid through the cooling system with a pump, contains regions of turbulence. Turbulence is defined as an eddy-like state of fluid motion where the inertial vortex forces of the eddies are larger than any of the other forces which tend to damp the eddies out. Simply turbulence is composed of eddies: patches of swirling fluid moving randomly about the overall direction of fluid flow. Thus turbulence may be used as a source of entropy to generate random numbers.

One such property of turbulent fluids that may be measured is pressure. In a turbulent fluid, the pressure fluctuations are related to the amount of entropy in the system. Thus, the greater the pressure fluctuations, the higher the amount of entropy of the system. Therefore, the pressure of the turbulent fluid maybe used as a source of entropy to generate random numbers.

Figure 2:
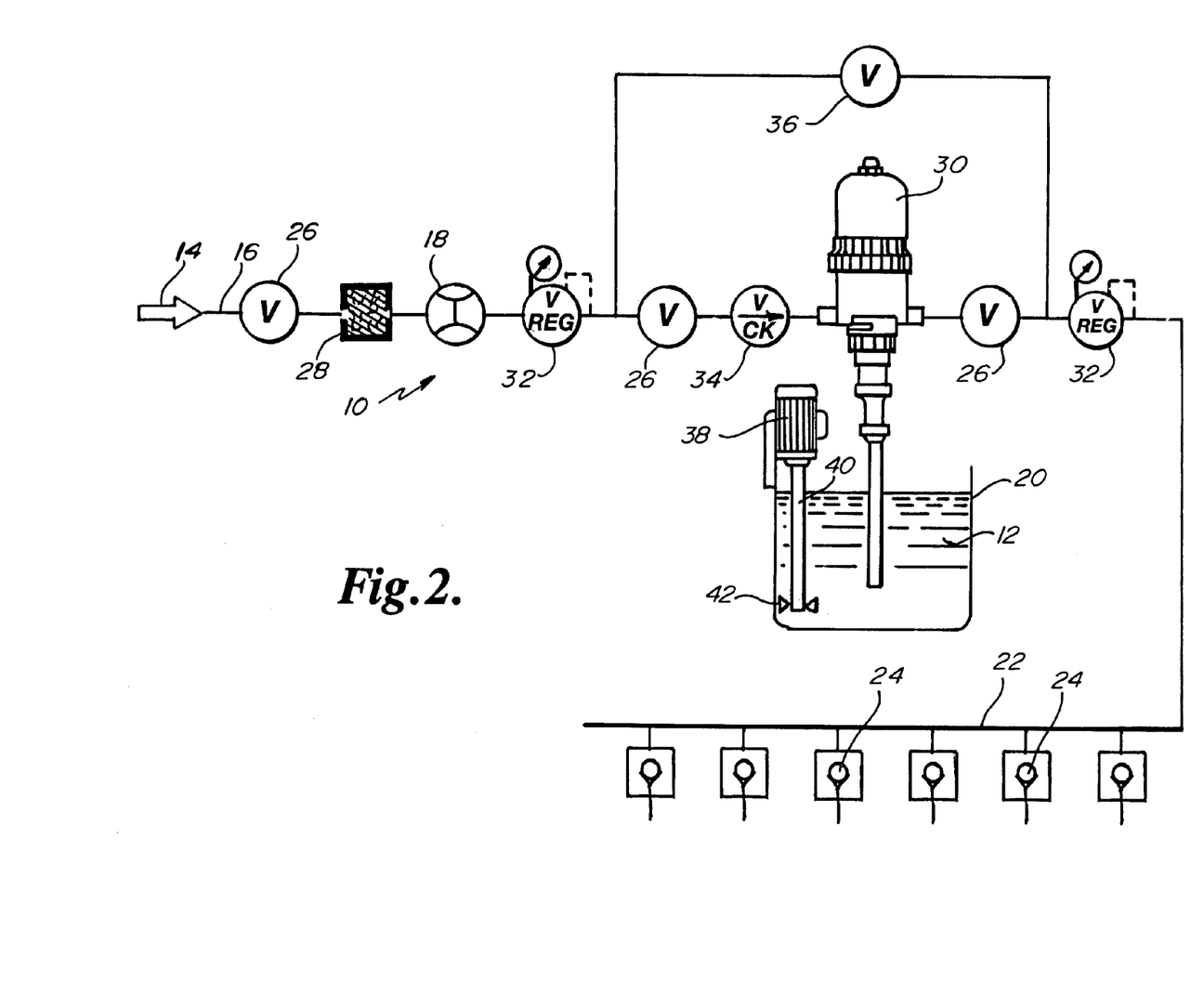
FIG. 2 illustrates a random number generation system in accordance with one embodiment of the invention.

FIG. 2 illustrates a random number generation system in accordance with one embodiment of the invention. The random number generation system includes heat dissipating components (20), a pump (22), and a heat exchanger (24) connected via piping (28a). Further, the random number generation system includes a coolant source (26) connected to the heat exchanger (24) via piping (28b). Additionally, a pressure sensor (30) is attached to the piping (28a) in a turbulent region. A pressure monitor (32) connected to the pressure sensor (30) monitors the pressure at the location of the pressure sensor (30) and forwards the data to a computation module (34) via a data line (35).

The placement of the pressure sensor (30) is governed by two factors: (i) identification of a turbulent region within the piping (28a) and (ii) identification of a position within a turbulent region where there is a sufficient amount of turbulence as required by a user of the invention.

The turbulent region may be identified using Reynold's number (Re). Reynold's number is defined by the following equation:

$$Re = \frac{\rho V D}{\mu}, \text{ where}$$

$\rho$ is the density of the cooling fluid, V is the velocity of the cooling fluid, D is the diameter of the piping (28a) and $\mu$ is the viscosity of the cooling fluid. The diameter (D) and the velocity of the fluid (V) are usually constant. However, density ($\rho$) and viscosity ($\mu$) of the cooling fluid are dependent on the temperature of the cooling fluid and may vary substantially over the length of the piping (28b). A region is considered turbulent if the Reynold's number is greater than about 4000.

Once the turbulent region has been identified the pressure sensor (30) may be inserted into a convenient location inside the piping within the turbulent region. Depending on the diameter (D) of the piping (28a) there may a distribution of turbulence across the diameter. Consider the case when heated cooling fluid is exiting the heat dissipating components (20). In this case the cooling fluid closest to the wall of the piping (28a) will cool down faster than the cooling fluid near the core of the piping (28a). Thus a turbulence distribution will be established with the cooling fluid at the core having the highest turbulence and the cooling fluid near the walls of the piping (28a) having the lowest turbulence.

The amount of turbulence required to generate the random numbers is generally dependent on the number of random numbers required at a specific time and the sensitivity of the pressure sensor (30). If a large set of random numbers is required in a short period of time than placement of the pressure sensor (30) in a high turbulence region is desirable. However, the placement of the pressure sensor (30) must be balanced by the sensitivity of the pressure sensor (30). For example, if the pressure is fluctuating too rapidly then the pressure sensor (30) and accompanying pressure monitor (32) may not be able to lock-on to the pressure long enough to obtain a reading. However, with increasing advances in technology the limitations due to sensitivity of pressure sensors (30) is decreasing. For example, a suitable sensor is a sub-miniature pressure sensor designed to operate in high frequency environments sold under the trade name ENTRAN, by Entran Sensors & Electronics located in Fairfield, N.J., USA.

Returning to FIG. 2, the readings from the pressure sensor (30) are recorded by the pressure monitor (32). The pressure monitor (32) may be any recording device that can interface with the pressure sensor (30). Output (35) of the pressure monitor (32) is subsequently fed into the computation module (34). The computation module includes functionality to take the output (35) of the pressure monitor (32) and generate a random number (or a set of random numbers). Those skilled in the art will appreciate that the pressure monitor (32) and the computation module (34) may be integrated into a single computer, or located on different computers without changing the scope of the invention.

Figure 3:
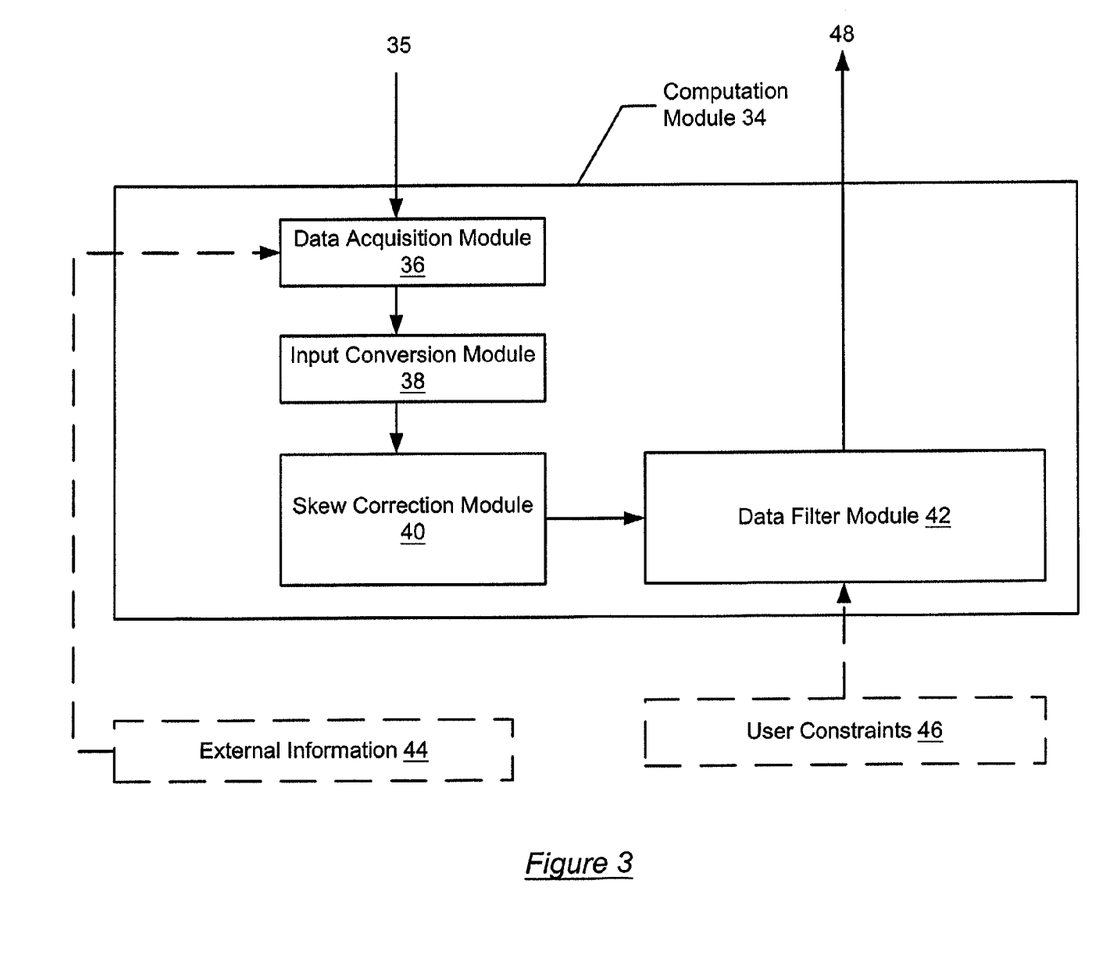
FIG. 3 illustrates a detailed view of a computation module in accordance with one embodiment of the invention.

FIG. 3 illustrates a detailed view of a computation module in accordance with one embodiment of the invention. The computation module (34) includes a data acquisition module (36), an input conversion module (38), a skew correction module (40), and a data filter module (42). The data acquisition module (36) receives output (35), from the pressure monitor (32 in FIG. 2) and using the output (35) acquires the information to generate the random number. In one embodiment of the invention, the data acquisition module (36) uses the absolute pressure obtained from the output (35). In another embodiment of the invention, the data acquisition module (36) uses the output (35) to determine the time between the occurrence of two pressure that are the same (i.e., determines the time when a pre-determined pressure is observed by the pressure sensor (not shown) and when it occurs again). In this case, external information (44), in the form of a system clock reading, is required. In another embodiment of the invention, data acquisition module (36) may be designed to record the difference between two subsequent pressure readings.

Once the data acquisition module (36) has acquired the necessary data, the data are forwarded to the input conversion module (38). The input conversion module (38) converts the data into a binary representation. Those skilled in the art will appreciate that while a binary representation is used, the data may be converted into another representation that can be easily manipulated. Once the data are converted into a binary representation, the data may be further manipulated. For example, the randomness of the data may be increased by dropping a selected number of most significant bits (i.e., dropping the four most significant bits for each portion of the data forwarded by the data acquisition module (36)). For example, a portion of data may correspond to one pressure measurement, thus, for each pressure measurement forwarded from data acquisition module (36) to the input conversion module (38) the four most significant bits will be dropped.

The output of the input conversion module (38) is then forwarded to the skew correction module (40). Skew correction (preformed by the skew correction module (40)) is preformed on the binary representation to ensure that there is an approximately distribution of 0's and 1's. In one embodiment of the invention, skew correction is preformed using a transition mapping algorithm. The transition mapping algorithm reads in two bits of the binary representation at a time, if there is a transitions (i.e., the bits are 10 or 01) than the bits are regarded as random. If there is no transition (i.e., bits are 00 or 11) then the bits are discarded. This process is repeated from all bits in the binary representation.

The output from the skew correction module (40) is then forwarded to the data filter module (42). The data filter module (42) converts the skew corrected binary representation into a list of random numbers. In one embodiment of the invention the data filter module (42) uses a default setting. For example, if a researcher only requires random numbers between 0 and 1000 then the data filter module (42) converts the skew corrected binary representation into integers numbers between 0 and 1000. As 1000 is not a power of 2, in one embodiment of the invention, the data filter module (42) will break the data into 10-bit segments and subsequently convert the 10-bit segments into a decimal (base-10) representation. Because $2^{10}=1024$, all numbers greater than 1000 are discarded.

Those skilled in the art will appreciate that the individual modules within the computation module (34) may be modified to be implemented on a multi-user system without changing the scope of the invention.

In one embodiment of the invention, the requirements for the set of random numbers are variable such as in the case where there are multiple researchers using the invention each with a different random number requirement. In this case the data filter module (42) takes additional input in the form of user constraints (46) to generate the random numbers. For example, a researcher may require random numbers only with a certain numeric range, e.g., only numbers between 25 and 125.

The output (48) of the data filter module (42) is then forwarded to the user. Typically, the user is a computer process requesting random numbers.

The invention may have one or more of the following advantages. The invention provides a convenient means for obtaining random numbers using an easily accessible source of entropy. The invention provides a means for generating random numbers that does not require any input from the user or any input from a source external to the computer system in which the invention is implemented. Further, the random numbers generated by the invention are not affected by/or related events outside the computer system in which the invention is implemented.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A random number generation system, comprising:
    a pressure sensor adapted to monitor a pressure of a turbulent fluid source; and
    a computation module operatively connected to the pressure sensor the module adapted to generate a numeric representation of the pressure
    wherein the computation module comprises:
        a data acquisition adapted to convert output of the sensor to numbers;
        an input conversion module for converting the numbers into a binary representation;
        a skew correction module for correcting a distribution of values in the binary representation to produce a corrected binary representation; and
        a data filter module for generating random numbers from the corrected binary representation.

2. The system of claim 1, wherein the data acquisition module is adapted to obtained data from an external source.

3. The system of claim 2, wherein the external source comprises a system clock.

4. The system of claim 1, wherein the data filter module is adapted to accept a user constraint.

5. The system of claim 4, wherein the user constraint comprises a numeric range.

6. The system of claim 1, wherein the skew correction module is adapted to apply a transition mapping algorithm to the numbers.

7. The system of claim 1, wherein the turbulent fluid source comprises a fluid cooling system for a computer.

8. A method for generating a random number, comprising:
    measuring a pressure in a turbulent fluid;
    converting the measured pressure into numbers;
    skew correcting the numbers to obtain corrected numbers; and
    generating the random number using the corrected numbers.

9. The method of claim 8, wherein the skew correction uses a transition mapping algorithm.

10. The method of claim 8, wherein the random number is generated using a user constraint.

11. The method of claim 10, wherein the user constraint comprises a numeric range.

12. The method of claim 8, wherein a source of the turbulent fluid is a fluid cooling system for a computer.

13. The method of claim 8, wherein the pressure is measured using an electronic pressure sensor.

14. An apparatus for generating a random number, comprising:
    means for measuring a pressure in a turbulent fluid;
    means for converting the measured pressure into numbers;
    means for skew correcting the numbers to obtain corrected numbers; and
    means for generating the random number using the corrected numbers.

* * * * *

UNITED STATES PATENT AND TRADEMARK OFFICE
CERTIFICATE OF CORRECTION

PATENT NO. : 6,999,982 B2  
DATED : February 14, 2006  
INVENTOR(S) : Dunn

It is certified that error appears in the above-identified patent and that said Letters Patent is hereby corrected as shown below:

The Title page should be deleted and replaced with the attached Title page.

Delete drawing sheets 1 and 2 and replace with the attached drawing sheets.

Signed and Sealed this

Thirteenth Day of June, 2006

JON W. DUDAS  
*Director of the United States Patent and Trademark Office*

(12) United States Patent
Dunn (10) Patent No.: US 6,999,982 B2
(45) Date of Patent: Feb. 14, 2006

(54) METHOD AND APPARATUS FOR GENERATING RANDOM NUMBERS USING TURBULENT FLUID

(75) Inventor: Tim Dunn, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 597 days.

(21) Appl. No.: 10/167,322

(22) Filed: Jun. 11, 2002

(65) Prior Publication Data

US 2003/0229657 A1    Dec. 11, 2003

(51) Int. Cl.
G06F 1/02        (2006.01)
(52) U.S. Cl. ..................... 708/250; 708/255
(58) Field of Classification Search ......... 708/250–256
See application file for complete search history.

(56) References Cited

U.S. PATENT DOCUMENTS

RE31,217 E  *  4/1983  Rodely ............... 73/861.22
5,732,138 A  *  3/1998  Noll et al. ............. 380/28
6,463,449 B1 * 10/2002  Tichenor ............... 708/255
2002/0018563 A1 *  2/2002  Tichenor ............... 380/44

OTHER PUBLICATIONS

M. Haahr, Jun. 1999; "Induction to Randomness and Random Numbers," http://www.random.org/essay.html; printed May 7, 2002; 5 pages.
S. Garner, Thermacore Inc.; "Heat pipes for electronics cooling applications," http:/www.electronics-cooling.com/Resources/EC_Articles/SEP96/sep96_02.htm; printed May 8, 2002; 11 pages.
R. Simons, Electronics Cooling Applications, "Direct liquid Immersion cooling for high power density microelectronics, "http:/www.electronics-cooling.com/Resources/EC_Articles/MAY96/may96_04.htm; printed May 8, 2002; 8 pages.

* cited by examiner

Primary Examiner—D. H. Malzahn
(74) Attorney, Agent, or Firm—Osha Liang LLP (57) ABSTRACT

A random number generation system, including a turbulent fluid source, a pressure sensor adapted to monitor a pressure of the turbulent fluid source, and a computation module operatively connected to the pressure sensor the module adapted to generate a numeric representation of the pressure.

14 Claims, 3 Drawing Sheets

Figure 1
(Prior Art)

*Figure 2*